June 4, 1963

G. J. SAXENMEYER 3,092,811

DATA INPUT DEVICE

Filed July 21, 1958

INVENTOR
GEORGE J. SAXENMEYER
BY William R. Barrett
ATTORNEY 3,092,811

DATA INPUT DEVICE

George J. Saxenmeyer, Vestal, N.Y., assignor to International Business Machines Corporation, New York, N.Y., a corporation of New York Filed July 21, 1958, Ser. No. 749,747
1 Claim. (Cl. 340—172.5)

The present invention relates to a data input device for a data storage medium. In particular, the present invention comprises a sensing mechanism for a record card in which the time period for scanning each row of data in a record card approximates the access time of a rotating magnetic drum.

Access time to a data storage medium denotes the maximum time necessary for a given block of information or data to be stored at a particular location on the medium. For a magnetic drum, this would approximate the time necessary to complete one revolution.

In an arrangement for entering data from a punched card directly into a rotating drum storage unit, it has been the practice to maintain the card feed speed at a rate which allows each row of punched hole information a time interval which is greater than the access time. This is necessary in order to enable cyclically presented data to the drum to be stored on the drum under the worst possible condition, i.e., the position at which the information is to be recorded has just passed the recording heads.

In a row of data on a punched card, the punched hole will approximate one half of the row. The remainder of the row is unperforated. It is therefore apparent that the rate of data input is limited by the revolution rate of the storage drum to approximately half the rate at which the drum would be willing to accept information. In this arrangement, therefore, approximately twice as much time is utilized in sensing a row of information as is necessary for providing an ouput pulse having a duration equal to the access time.

To solve this impasse between card reading speed and drum access time, the present invention utilizes the time period between possible brush impulses to achieve an input data flow to the magnetic drum memory which approximates the access time of the drum. This concept utilizes, as a means of implementation, high speed switching devices which, as described hereinafter in the preferred embodiment, are magnetic cores but which could be electronic or passive switching elements of conventional configuration.

By utilizing the time period between possible brush impulses, the available time for reading has been extended to approximately the time required for a row of data to pass under the sensing brushes. By so using the entire time of travel of the card for a row of information, the speed of card feeding may be increased to approximately twice the speed achieved by using only the perforation for a data input pulse to the drum storage device.

It is therefore an object of this invention to provide an improved apparatus for reading information into a data storage medium.

A further object of this invention is to provide an apparatus for reading information into a data storage medium at a rate which approximates the access time of the storage medium.

Another object of this invention is to provide an apparatus for reading punched record cards at a rate approximately twice that used previously and storing the information in a rotating magnetic storage drum.

Other objects of the invention will be pointed out in the following description and claim and illustrated in the accompanying drawing which discloses, by way of examples, the principle of the invention and the best mode, which has been contemplated, of applying that principle.

Data in conventional record cards is stored as perforations in particular rows and columns. The columns of data are numbered across the long side of the card while the rows are numbered across the short end. Alphabetic data is represented by the presence of two holes in a particular column, while digital information is represented by a single punch in a particular row one to nine. For the present invention, only the digital data will be discussed for purposes of simplicity, but the invention applies equally to alphabetic.

Figure 1:
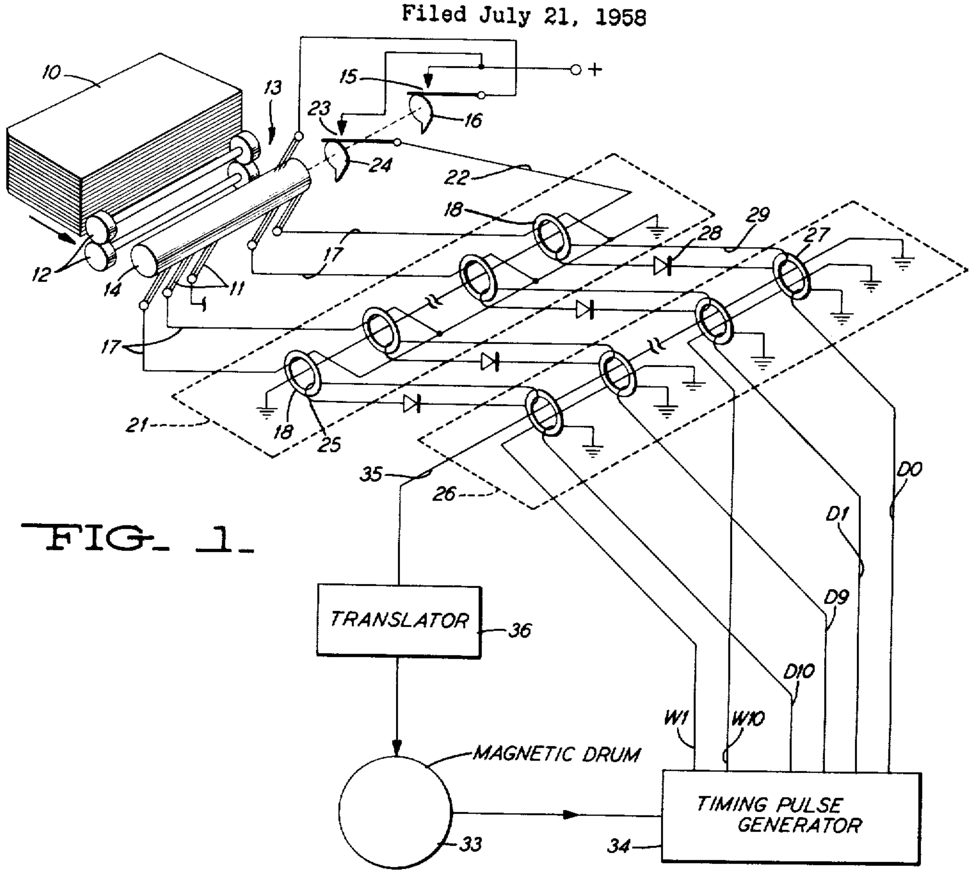
FIG. 1 is a schematic illustration of the invention.
Figure 2:
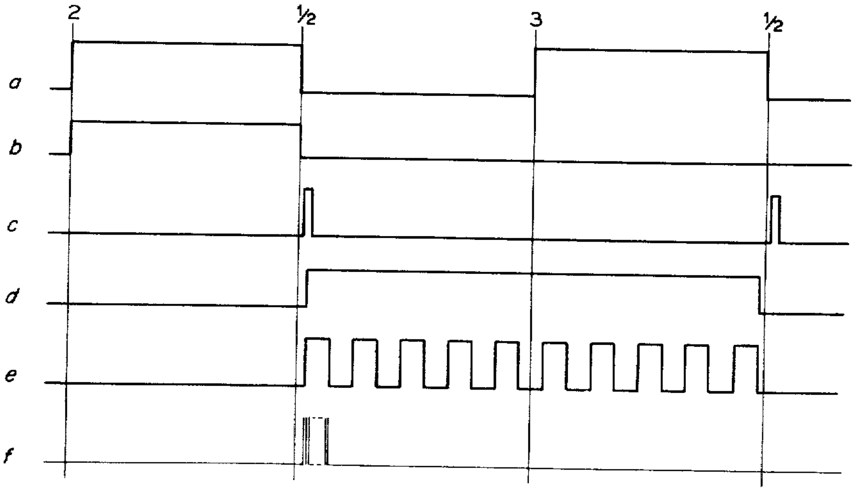
FIG. 2 is a pulse timing diagram of the elements shown in FIG. 1.

A batch of record cards 10, FIG. 1, to be read, are stacked in a hopper, not shown, so that they rest on an oscillating picker knife (not shown) which feeds cards from the bottom of the stack to power driven feed rolls 12 which move each card to a sensing station 13. In the sensing station, a conductive roll 14 has applied thereto a potential through a circuit breaker 15 which opens and closes for each possible data position, as shown in FIG. 2(*a*). The circuit breaker 15 is closed for the proper duration by a cam 16 operated by contact roll 14. A record card to be sensed passes between the conducting roll and sensing brushes 11 aligned with each card column. Each time a sensing brush makes contact through a hole in the record column, an accurately defined pulse is applied to a particular output line 17. The pulses for rows two and three are shown in FIG. 2(*a*). The cycle points are indicated in FIG. 2 by the vertical lines intersecting lines *a–f* and indicate particularly the beginning and end of card column two.

As each row of information is sensed by the brushes, any punched hole will allow a circuit to be completed and operate a magnetic core 18 to a particular stable state indicative of the fact that a hole was then sensed. For a particular column, FIG. 2(*b*), a pulse is shown as being sensed in row two. At this time, a transfer core 18 associated with this particular column is set in the transfer core circuit 21. The core circuit is shown with the various windings for operating each individual core to either of its two stable states. Since core circuits of this type are conventional, no attempt has been made to show particularly the number of turns on each winding.

The number of cores 18 would be equal in number to the columns of data which are to be sensed in the cards 10. With the pulse, FIG. 2(*b*), appearing on an output line 17, a particular core 18 will be set by the first portion of the pulse.

At the half cycle point, midway between beginning and end of a particular cycle point and after termination of the row pulse, the transfer cores 18 are reset. These cores 18 are reset by a pulse applied to a winding 22 threaded through each one which is connected through a circuit breaker 24 connected to plus potential. Cam 24, which is connected to contact roll 14, closes the circuit breaker at the proper time. By virtue of the change in the state of magnetization of any core 18, which had been set, a current is induced in a winding 25 coupled to a corresponding core in a storage core circuit 26. Any information or data then contained in the transfer cores 18 is transferred to storage cores 27. A diode 28 in each connecting line 29 is utilized to provide current flow in only one direction to insure that cores 27 will be set by the change in state of cores 18 being reset and will not be reset by cores 18 being set. The core 27, associated with the core 18, which has been set by the pulse, FIG.

2(*b*), is set to indicate the presence of a perforation, FIG. 2(*d*).

From the rotating storage drum 33, a series of timing pulses are available, as shown in Patent No. 2,798,554, to C. B. Smith, indicative of the particular word and digit location beneath the reading heads. These pulses, not shown, are utilized to drive a timing pulse generator 34 which furnishes pulses for each word and digit to separate output lines. For simplicity, only a few of the lines are shown. As shown in the timing pulse diagram, FIG. 2, all digit pulses, FIG. 2(*f*), occur successively for each word pulse, FIG. 2(*e*). For convenience, only a few of the digit pulses, FIG. 2(*f*), are shown. Each core is threaded by a digit winding and a word winding so that upon concurrence of both a digit pulse and a word pulse and consequently sufficient current to switch a core, the particular core will be reset, if there is an indication stored therein, to a zero state and the resulting change in state, if any, will induce a current into an output winding 35 connected to a translator 36.

A translator is utilized in changing the information contained in the storage cores to a form which is desirable for recording on the magnetic drum. This type of circuit is shown in the above-mentioned patent to C. B. Smith. The output from the translator is therefore recorded in the digit and word space selected by the timing pulses.

This invention can be readily appreciated from the timing pulse diagram, FIG. 2, wherein the pulse, FIG. 2(*a*), from a particular column and row, which occupies approximately half of the distance between cycle points, has been changed to an indication, FIG. 2(*d*), of a time duration sufficient to allow any digit and word pulse, FIGS. 2(*e*) and 2(*f*), to occur and record the presence of indication, FIG. 2(*d*) on the drum 33.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

In combination, a sensing device for record medium in which data manifestations are contained in a plurality of rows and in which characters are represented by the permutation of manifestations in a column of said medium, said sensing device including medium advancing means to move said record medium through said sensing device whereby successive rows of data manifestations are periodically made available for sensing, a first buffer storage connected to said sensing means for said data manifestations, first circuit closing means synchronized with the passage of said medium and operable in the time in which said manifestations are available to store an image of said row manifestations then being read, a second magnetic core buffer storage connected to said first buffer storage to store an image of said row manifestations, second circuit closing means synchronized with said medium and operable subsequent to the time in which said manifestations are available to said first buffer to simultaneously transfer all columns of data manifestation in said first buffer to said second buffer and to reset said first buffer to accept the next successive row of data, a rotating magnetic storage drum electrically connected to said second buffer and containing a plurality of said storage locations for each column of data contained on said medium cyclically available to accept said data, said data storage device having a cycle time which approximates the time interval between the successive transfers of information to second buffer storage whereby any column in a row of data manifestations is available for transfer to a particular storage location on said data storage device during the cycle succeeding the transfer of data to said second buffer.

References Cited in the file of this patent

UNITED STATES PATENTS

| | | |
|---|---|---|
| 2,702,380 | Brustman | Feb. 15, 1955 |
| 2,946,047 | Morgan | July 18, 1960 |